(12) United States Patent
Florindez

(10) Patent No.: US 9,763,455 B1
(45) Date of Patent: Sep. 19, 2017

(54) APPARATUS SYSTEM AND PROCESS FOR MAKING A BAKERY PRODUCT

(71) Applicant: Augusto Florindez, La Mirada, CA (US)

(72) Inventor: Augusto Florindez, La Mirada, CA (US)

(73) Assignee: Stewart Systems Baking, LLC, Plano, TX (US)

(*) Notice: Subject to any disclaimer, the term of this patent is extended or adjusted under 35 U.S.C. 154(b) by 908 days.

(21) Appl. No.: 13/938,492

(22) Filed: Jul. 10, 2013

(51) Int. Cl.
| | |
|---|---|
| A21C 13/00 | (2006.01) |
| A21C 1/00 | (2006.01) |
| A21C 13/02 | (2006.01) |
| A21C 11/16 | (2006.01) |
| A21C 1/14 | (2006.01) |
| A21C 11/10 | (2006.01) |
| A21C 9/08 | (2006.01) |
| A21C 15/00 | (2006.01) |

(Continued)

(52) U.S. Cl.
CPC .............. *A21C 1/003* (2013.01); *A21C 1/14* (2013.01); *A21C 1/145* (2013.01); *A21C 1/1405* (2013.01); *A21C 3/02* (2013.01); *A21C 3/04* (2013.01); *A21C 5/00* (2013.01); *A21C 5/006* (2013.01); *A21C 9/08* (2013.01); *A21C 9/083* (2013.01); *A21C 11/10* (2013.01); *A21C 11/16* (2013.01); *A21C 13/00* (2013.01); *A21C 13/02* (2013.01); *A21C 15/00* (2013.01)

(58) Field of Classification Search
CPC .. A21C 5/00; A21C 15/00; A21C 3/04; A21C 11/16; A21C 1/003; A21C 31/00; A21C 11/10; A21C 1/14; A21C 1/1405; A21C 3/02; A21C 5/006; A21C 9/08; A21C 9/083; A21C 13/00; A21C 13/02; A21C 1/145
USPC ......................... 425/202, 205, 207, 145, 308
See application file for complete search history.

(56) References Cited

U.S. PATENT DOCUMENTS 3,917,856 A * 11/1975 Wong .................. A21C 3/04
                                                  426/128
4,490,046 A * 12/1984 Guibert ................. B01F 7/24
                                                  366/297

(Continued)

OTHER PUBLICATIONS

AMF Bakery Systems, DoFlow Dough Developers, Emico: Conventional Dough Mixes, Direct Deposit Bread Make-Up Systems, Copyright 2013, website printout Feb. 27, 2016.

*Primary Examiner* — Seyed Masoud Malekzadeh
(74) *Attorney, Agent, or Firm* — Kirby B. Drake; Klemchuk LLP

(57) ABSTRACT

A system to make a bread loaf includes means for moving continuously pans along a predetermined path, each pan including at least one cavity sized and configured for making a bread loaf. Means conditioning continuously a batch of unconditioned dough reduces the size of air pockets therein to form a conditioned dough. Means continuously extrude the batch of conditioned dough at a controlled volumetric feed rate and at a controlled pressure to provide a constant stream of conditioned dough that is continuously cut into individual packets. The entire batch is converted into individual packets of conditioned dough corresponding to a predetermined number of bread loaves to be produced from the batch, with all the packets deposited individually in cavities of the pans within 10-20 minutes after mixing ingredients that make the batch.

6 Claims, 14 Drawing Sheets

(51) Int. Cl.
*A21C 5/00* (2006.01)
*A21C 3/02* (2006.01)
*A21C 3/04* (2006.01)

(56) References Cited

U.S. PATENT DOCUMENTS

| | | | | |
|---|---|---|---|---|
| 4,948,611 A * | 8/1990 | Cummins | ............... | A21C 11/16 426/503 |
| 5,046,940 A * | 9/1991 | Cummings | ............ | A21C 11/16 425/239 |
| 5,060,562 A * | 10/1991 | Florindez | ............... | A21C 9/081 221/266 |
| 5,077,074 A * | 12/1991 | Van Lengerich | ........ | A21C 3/04 426/497 |
| 5,186,539 A * | 2/1993 | Manser | .................. | A21C 1/003 366/85 |
| 5,356,652 A * | 10/1994 | Campbell | ................ | A21C 5/00 425/311 |
| 5,378,133 A * | 1/1995 | Atwood | .................. | A21C 3/04 425/136 |
| 5,466,143 A * | 11/1995 | Suzuki | ..................... | A21C 3/04 425/140 |
| 5,476,035 A * | 12/1995 | Florindez | ............... | A21C 9/081 198/464.2 |
| 5,728,411 A * | 3/1998 | Fowler | ..................... | A21C 3/04 425/142 |
| 5,750,169 A * | 5/1998 | Rose | ......................... | A21O 5/00 425/145 |
| 5,817,361 A * | 10/1998 | Campbell | ............... | A21C 9/081 198/464.1 |
| 6,065,390 A * | 5/2000 | Florindez | ................. | A21B 7/00 198/431 |
| 6,561,235 B2 * | 5/2003 | Finkowski | ............. | A21C 9/083 141/168 |
| 6,626,660 B1 * | 9/2003 | Olson | ...................... | A21C 3/08 425/190 |
| 8,672,664 B2 * | 3/2014 | Uchida | ................. | A23G 3/0278 425/237 |
| 2002/0031589 A1 * | 3/2002 | Wenger | ................... | A21C 1/003 426/523 |
| 2009/0317524 A1 * | 12/2009 | Dautremont | ............ | A21C 3/04 426/242 |
| 2010/0147419 A1 * | 6/2010 | Balnoschan | ......... | A21C 15/002 141/192 |
| 2010/0206184 A1 * | 8/2010 | Oki | ......................... | A21O 5/00 99/538 |

\* cited by examiner

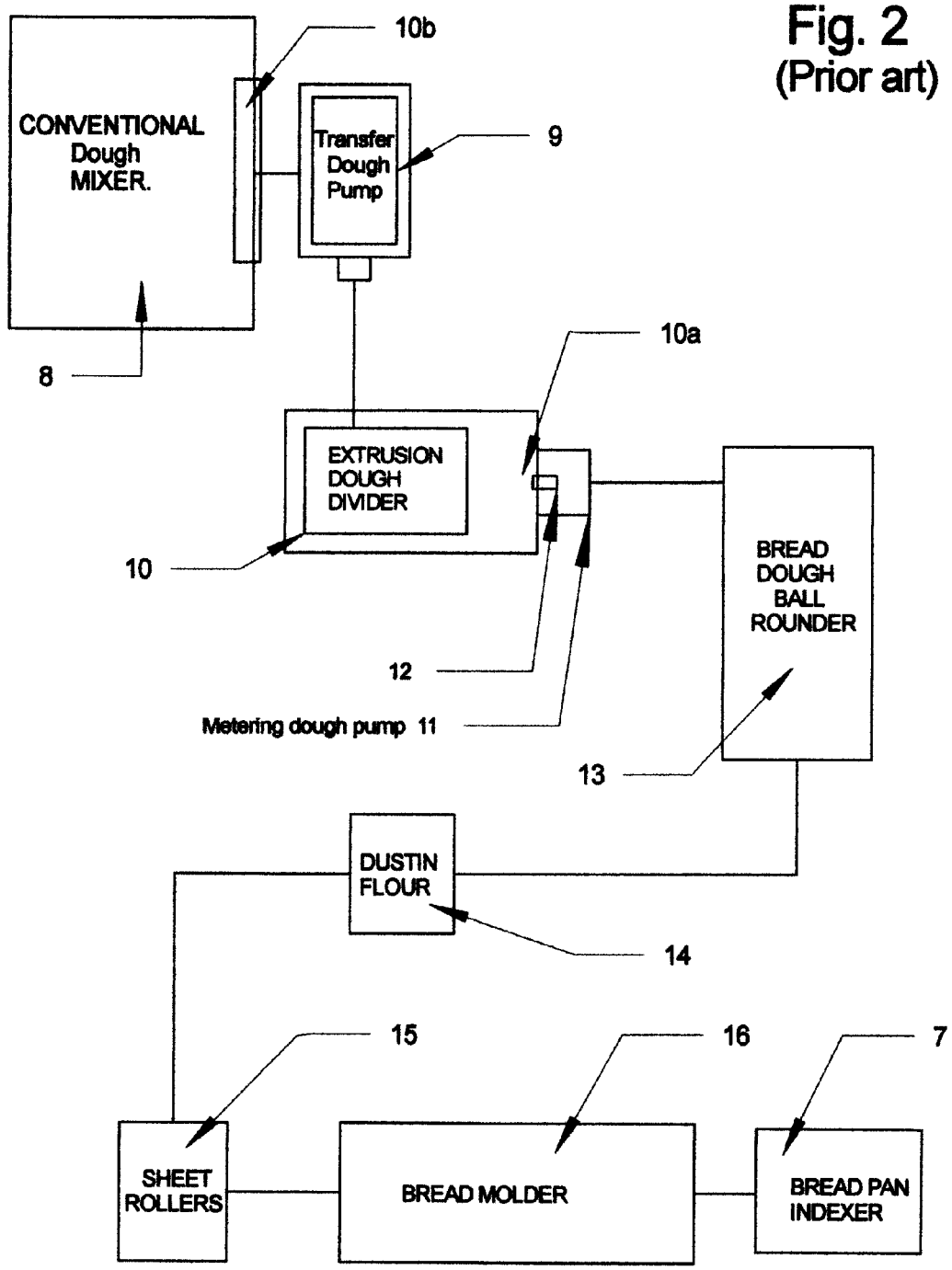

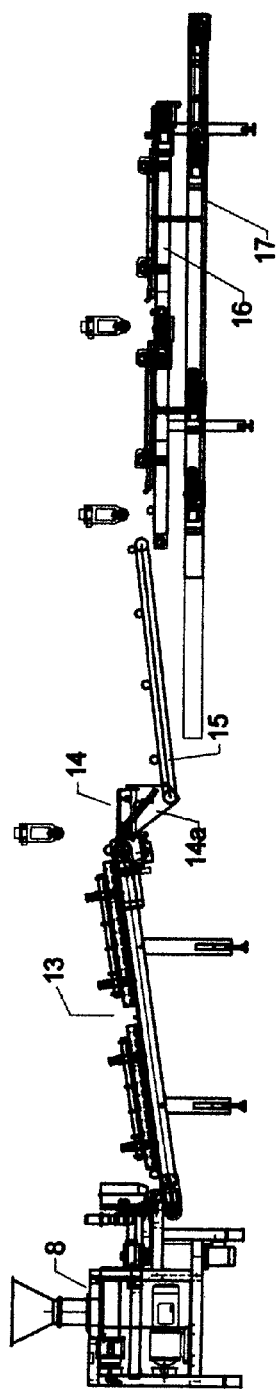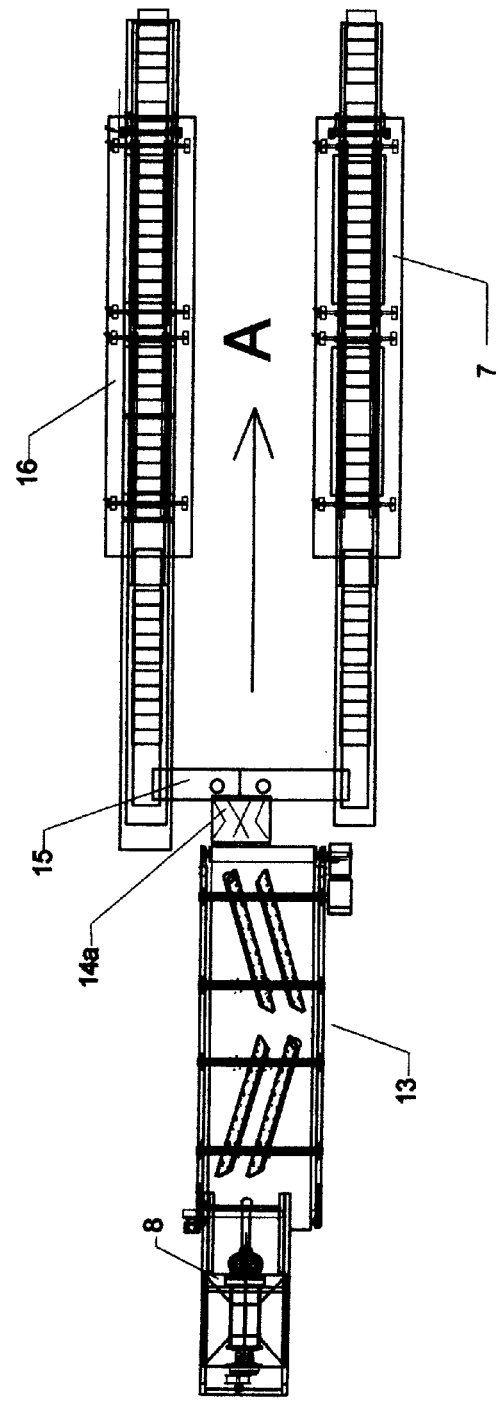
Fig. 2A (prior art)
Fig. 2B (Prior art)

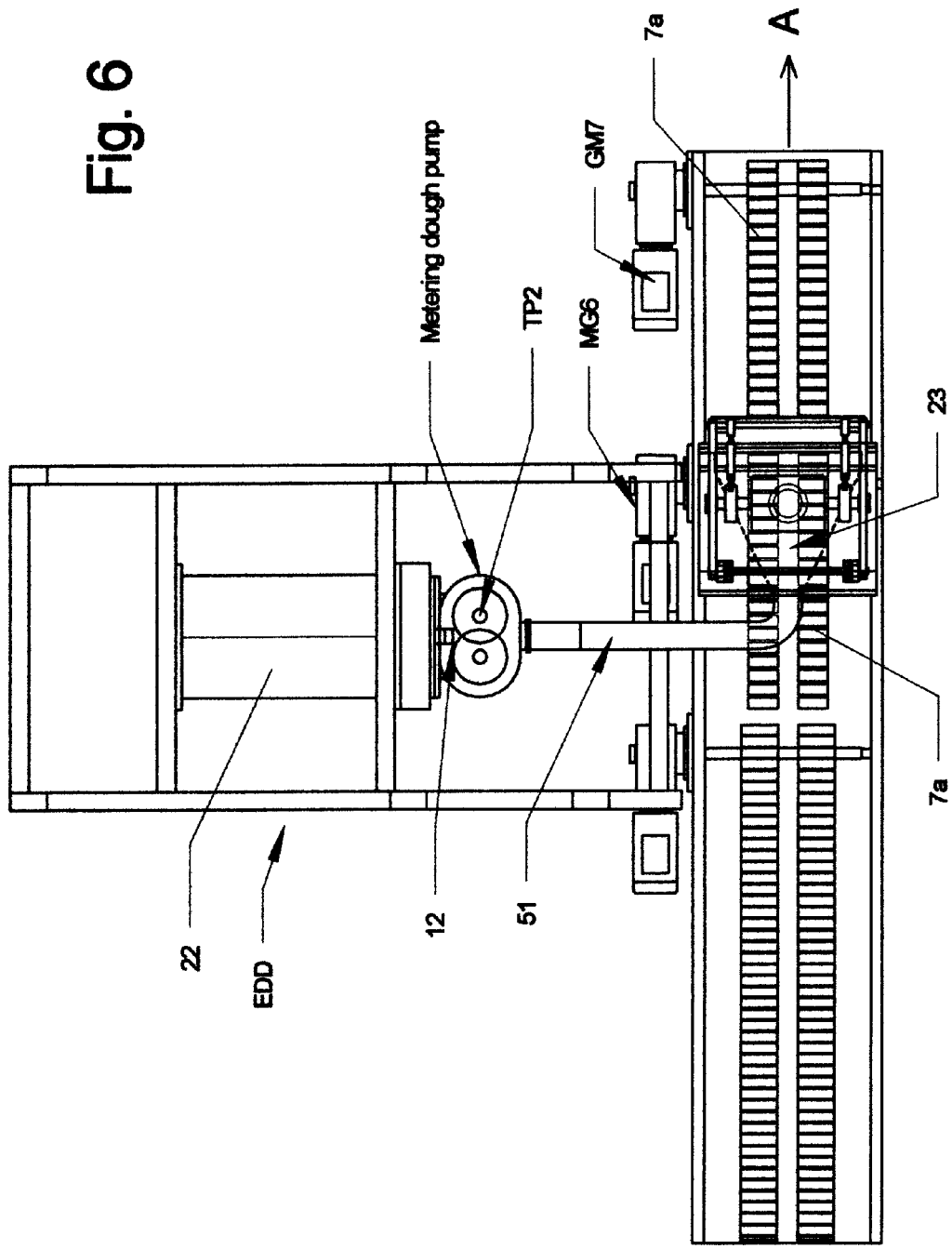

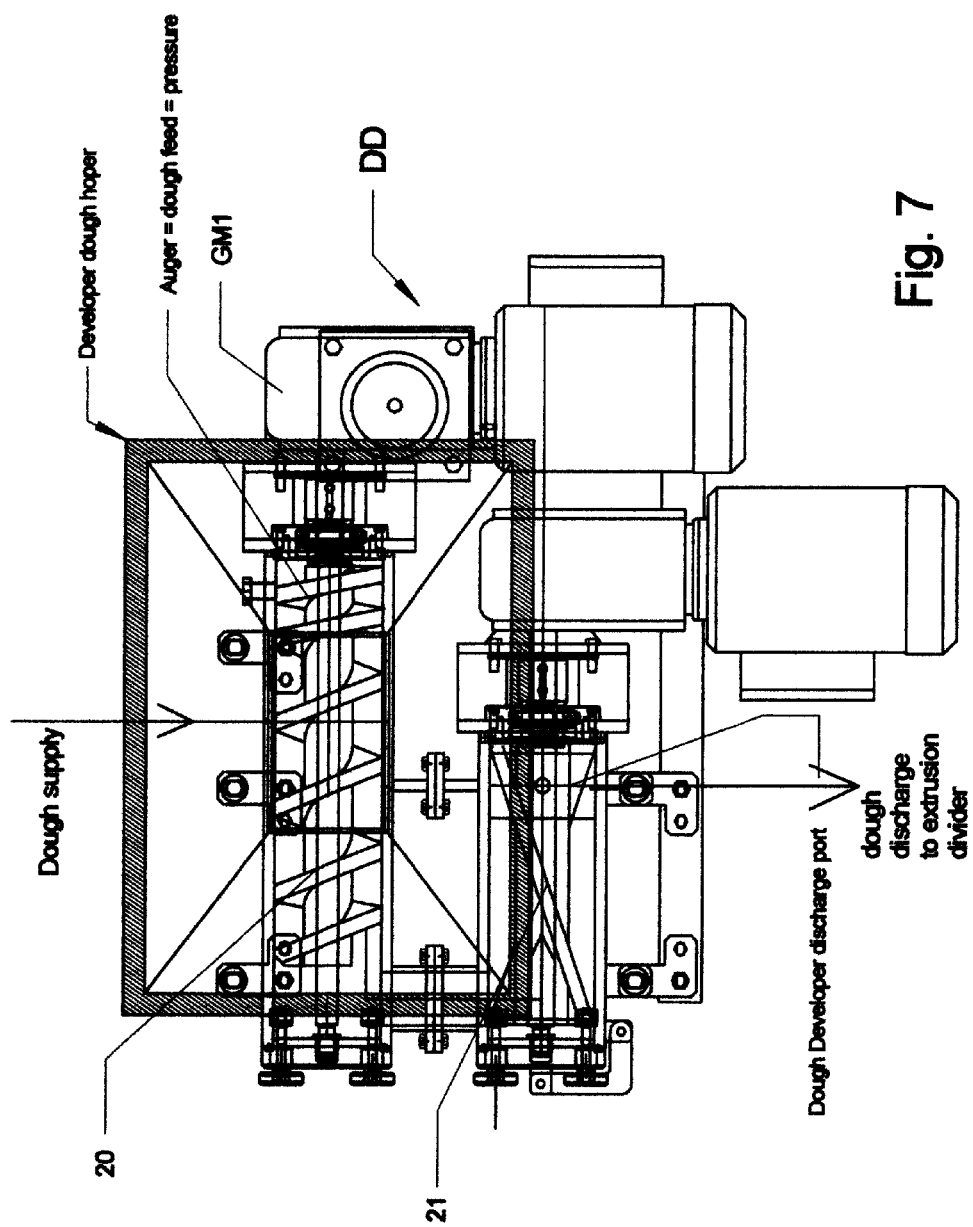

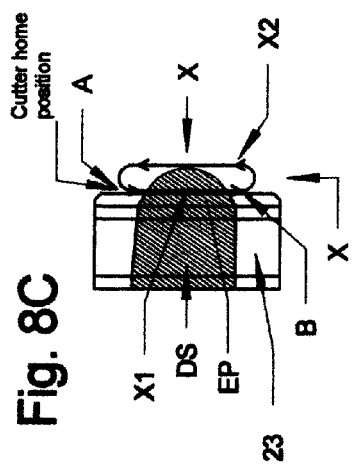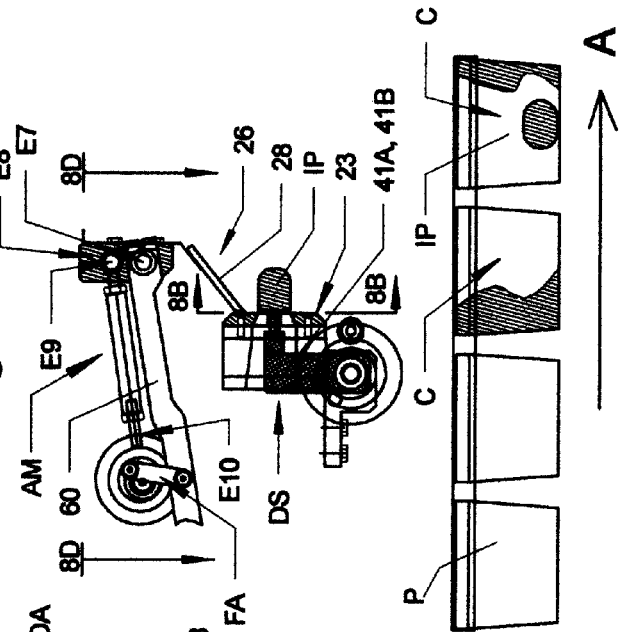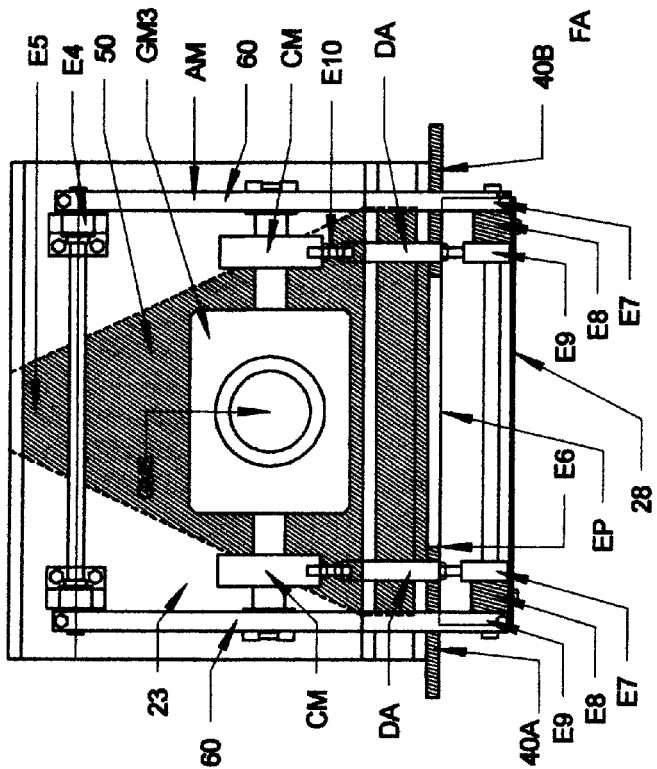

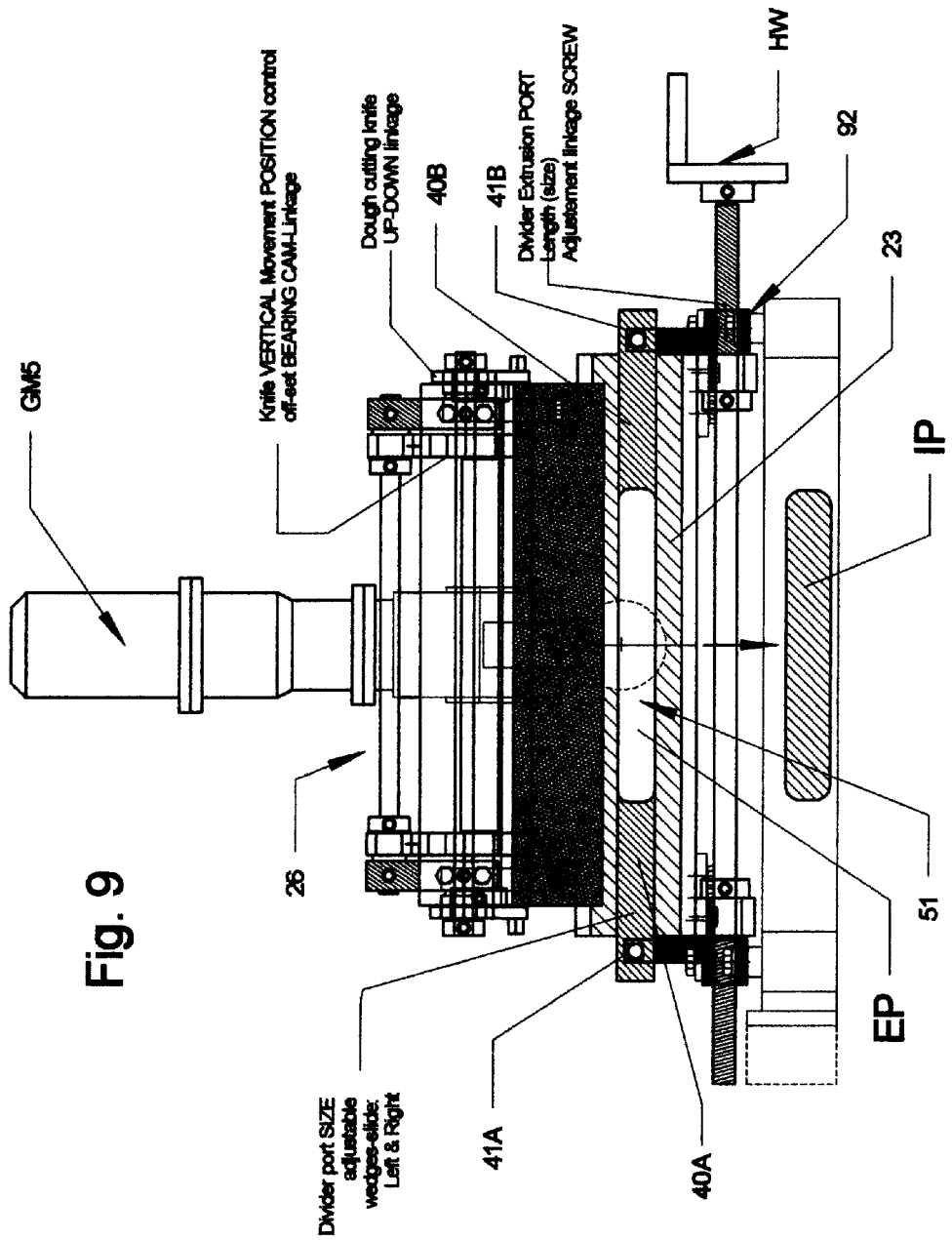

APPARATUS SYSTEM AND PROCESS FOR MAKING A BAKERY PRODUCT

INCORPORATION BY REFERENCE

Any and all U. S. patents, U. S. patent applications, and other documents, hard copy or electronic, cited or referred to in this application are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The word "rectangular" includes square.

BACKGROUND

When making bakery products, and in particular bread loaves, two different types of dough mixes are employed: a conventional batch mix and a continuous mix. The mix used in a conventional batch process provides a stiff dough that, on baking, produces a bread loaf having a firm texture that many consumers find highly desirable. An example of a conventional batch mix baked loaf of bread, is sold by Bimbo Bakeries USA, Inc. under the brand name Orowheat and others. A problem with any type of bread dough either continuous dough mix or conventional batch mix is that, after mixing of the ingredients called for by the mix's recipe, air pockets of different sizes are formed by the chemical reaction of the yeast, sugar, flour and other ingredients. As the dough is transferred from a mixer it ages and the dough starts to generate at the beginning small air pockets, but as the dough ages, the small air pockets become enlarged and different sized air pockets form, requiring conditioning.

In the batch process, the air pockets are reduced in size and rendered highly uniform in size by processing the dough using numerous pieces of equipment and processing steps as depicted in FIGS. 2, 2A and 2B, and discussed subsequently in greater detail. A dough developer unit is used in the continuous process to render the air pockets uniform; however, this produces a soft dough. But this soft dough, on baking, produces a bread loaf having a soft, spongy texture.

SUMMARY

In brief, my apparatus, system, and process using a conventional batch process dough mix produces a stiff dough that, on baking, produces a bread loaf having a firm texture that many consumers find highly desirable. My apparatus, system, and process eliminate most of the equipment and process steps required using known equipment and process steps to make a bread loaf having a firm texture using a conventional batch mix.

My apparatus, system and process for making bakery products has one or more of the features depicted in the embodiment discussed in the section entitled "DETAILED DESCRIPTION OF ONE ILLUSTRATIVE EMBODIMENT." The claims that follow define my apparatus, system and process, distinguishing them from the prior art; however, without limiting the scope of my apparatus, system and process as expressed by these claims, in general terms, some, but not necessarily all, of their features are:

One, my apparatus for making bread loaves includes a mixer in which ingredients to make a batch of bread dough are mixed. This batch provides a predetermined number of bread loaves. My apparatus converts the entire batch into individual packets of conditioned dough corresponding to the predetermined number of bread loaves to be produced from the batch. The individual packets are deposited individually directly in cavities of the pans within from 10 to 20 minutes after mixing the ingredients to make the batch without using flour and without additional processing of the dough prior to deposition in a pan cavity.

Two, a pan feeder continuously moves baking pans in a stepwise manner along a predetermined linear path, with each pan having at least one empty cavity sized and configured to bake a single bread loaf. The pan feeder includes a pair of aligned pan conveyors along the predetermined linear path along which the pans move that are spaced apart to provide a gap beneath the extrusion port to facilitate flushing waste matter from the apparatus during cleaning.

Three, a dough developer unit above the predetermined linear path reduces the size of air pockets within unconditioned dough, so that dough exiting the developer unit is conditioned.

Four, a first transfer pump continuously feeds the unconditioned dough from a holding hopper to the dough developer unit, and an extrusion unit below the dough developer unit and above the predetermined linear path continuously extrudes the conditioned dough into a dough stream. A second transfer pump continuously meters the conditioned dough from the extrusion unit through an extrusion port of a die manifold member of the extrusion unit. The extrusion port is in a face of a die manifold member from which the dough stream exits.

Five, a cutter unit above the predetermined linear path continuously cuts the dough stream into individual packets, a single packet to be deposited in an individual cavity in a pan moving along the predetermined path. The cutter unit includes a blade that moves through a predetermined closed path from a home position above the dough stream, along the face of the die manifold member past the extrusion port to sever the dough stream, and then away from the face of the die manifold in a manner to avoid interfering with the dough stream from continuing to exit unencumbered from the extrusion port. The blade is moved from a home position above the dough stream along a downward vertical-linear path at a first rate of speed and, after moving away from the face of the die manifold, is moved at a increased rate of speed to the home position at least in part along an upward vertical-linear path.

Six, the extrusion port is positioned relative to the predetermined linear path so that, upon cutting the dough stream, the single packet drops directly into a cavity of a pan positioned directly beneath the extrusion port. The extrusion port has a rectangular shape with opposed sides, each side comprising a laterally adjustable wedge-like slide element to enable the width of the extrusion port to be changed. The die manifold member includes a chamber having a generally flat top and flat bottom and outward sloping sides to form a generally shaped triangle configuration. There is an entry end at an apex of the triangular configuration and the extrusion port forms the base of the triangular configuration.

Seven, a control system delivers the dough stream to the cutter unit at a controlled volumetric feed rate and at a controlled pressure. The control system includes a monitoring element that senses the amount of conditioned dough being produced and, in response thereto, regulates the operation of the dough developer unit. The control system includes a pressure sensor that detects the pressure of the dough stream and a microprocessor programmed to operate speed controls as a function of the pressure.

My process of making a bread loaf from a conventional batch dough mix includes the following steps:

(a) moving continuously pans along a predetermined path, each pan including at least one cavity sized and configured for making a bread loaf, (b) conditioning continuously a batch of unconditioned dough to reduce the size of air pockets within the unconditioned dough and so produce a conditioned dough, (c) extruding continuously the batch of conditioned dough at a controlled volumetric feed rate and at a controlled pressure to provide a constant stream of conditioned dough, (d) continuously cutting the stream of conditioned dough into individual packets, a single packet being directly deposited in an individual cavity of a pan moving along the predetermined path without additional processing of the dough prior to deposition in the cavity.

The batch makes a predetermined number of packets and the process is completed for the batch within a predetermined time period so that a last packet of the batch and a first packet of the batch have the same uniform density and uniform texture. The entire batch is converted into individual packets of conditioned dough corresponding to the predetermined number of bread loaves to be produced from the batch. The packets are deposited individually in cavities of the pans within from 10 to 20 minutes after mixing ingredients that make the batch. Upon formation of a packet, the packet drops due to gravity directly into a cavity of a pan without further processing of the packet after cutting the dough stream to form the packet. The dough stream is processed without the use of flour to treat the dough stream.

These features are not listed in any rank order nor is this list intended to be exhaustive.

DESCRIPTION OF THE DRAWING

One embodiment of my apparatus, system and process is discussed in detail in connection with the accompanying drawing, which is for illustrative purposes only. This drawing includes the following figures (Figs.), with like numerals indicating like parts:

FIG. 2 is a schematic diagram illustrating a conventional batch bread dough mixing system.

FIG. 2A is side elevation view a bread loaf manufacturing line employing the prior art batch bread dough mixing system illustrated in FIG. 2.

FIG. 2B is top plan view a bread loaf manufacturing line shown in FIG. 2A.

FIG. 6 is a top plan view of the extrusion divider unit of my apparatus illustrated in FIGS. 4 and 5.

FIG. 7 is a top plan view of the developer unit of my apparatus illustrated in FIGS. 4 and 5, with sections broken away.

FIG. 8A is a side elevation view of a cutter of the dough divider unit positioned above the extrusion unit, which is above a series of empty pans moving beneath the extrusion unit, FIG. 8B is a cross-sectional view taken along line 8B-8B of FIG. 8A.

FIG. 8C is a diagram of a predetermined closed path the tip of a knife blade makes through one cycle of the cutter.

FIG. 8D is a sectional view taken along line 8D-8D of FIG. 8A.

FIG. 9 is a front elevation view of the cutter positioned to cut the dough stream from the extrusion unit.

FIG. 10A is a side elevation view with the cutter in its home position,

FIG. 10B is a side elevation view with the cutter in its down position, and

FIG. 10C is a side elevation view showing starting to return to the home position.

DETAILED DESCRIPTION OF ONE ILLUSTRATIVE EMBODIMENT

FIG. 1

Figure 1:
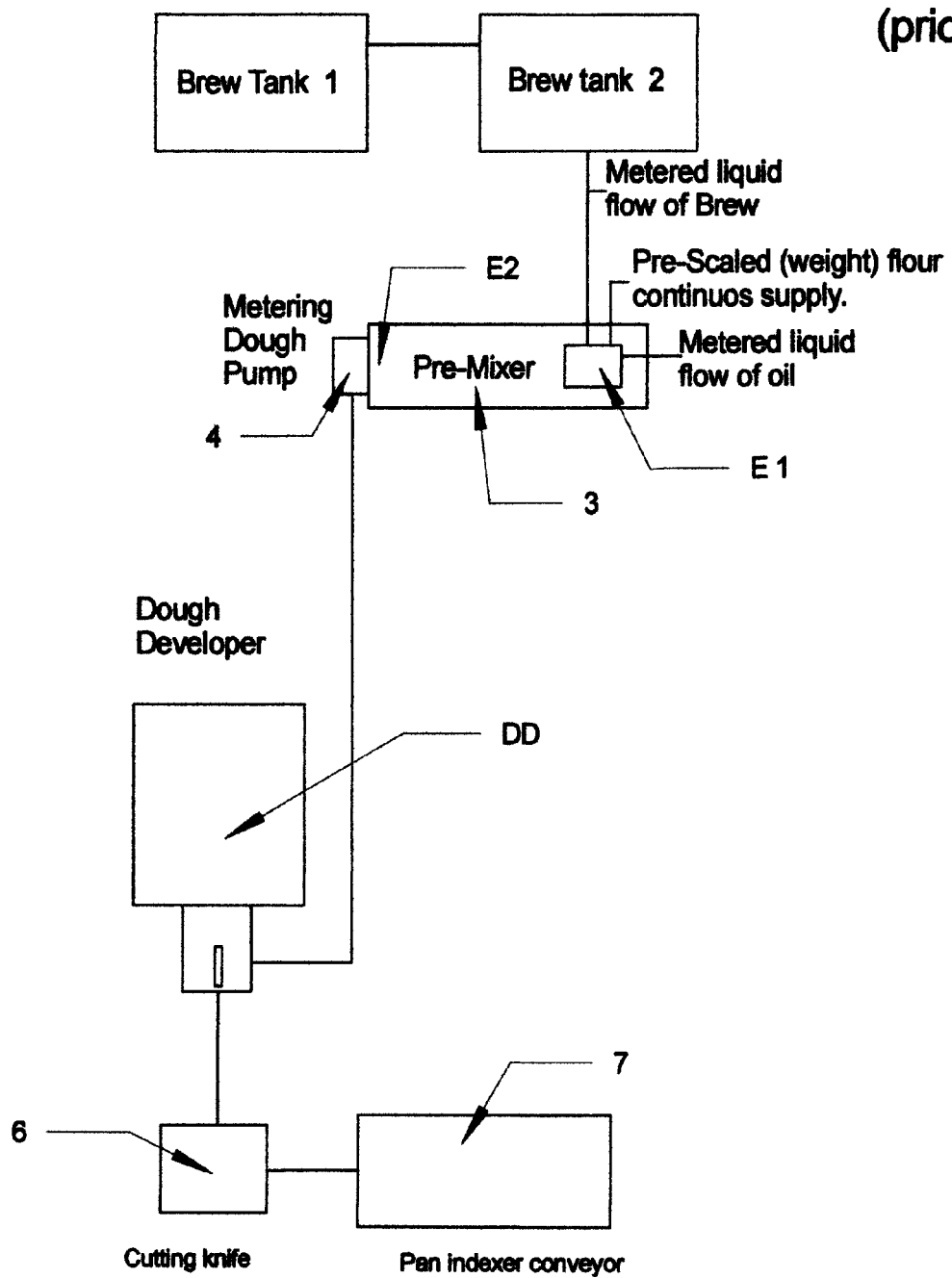
FIG. 1 is a schematic diagram illustrating a prior art continuous bread dough mixing system.

FIG. 1 depicts a continuous process (known as DO-Maker, Wallas and Thierman System) for making loaves of bread. In tank 1 mixing is conducted of all the basic ingredients to start a brew batch of a selected dough recipe, for example, to make whole-wheat, white, or multi-grain loaves of bread. The ingredients of this initial batch begin to ferment in tank 1. While in a highly fluid liquid state, the entire contents of tank 1 are pumped into tank 2. Tank 2 is a holding tank for the fermenting phase of the mixture of ingredients that is continuously transferred to a pre-mixer 3. The fluid from the tank 2 is metered as it is fed to the pre-mixer 3, and metered amounts of flour and oil are continuously added as this fluid flows into the pre-mixer 3. The pre-mixer 3 has at its intake end E1 two (2) shaft agitators (not shown) constructed with radial flat narrow blades (not shown) at the intake E1.

At its discharge end E2 the agitators become dual augers (not shown) rotating away from each other, one clockwise and the other counterclockwise. The fluid from the tank 2 is in a liquid state as it enters the intake end E1, being a soft and watery viscous mix. As this mix exits tank 2 flour and shortening (oil) are added at the intake E1, all these ingredients are mixed at the same time continuously to become a very soft dough including air pockets that exits the discharge end E2. The dough exits the pre-mixer 3 in a constant and evenly pressurized continuous flow of dough to a metering dough pump 4 that forwards this viscous dough to a dough developer unit DD. In the dough developer unit DD the dough is given its final mix and conditioning by kneading the viscous dough to render it of uniform density and uniform texture. The metering dough pump 4 pumps the metered dough as a continuous stream that is cut by a guillotine type dual knife cutter 6. The severed pieces individually drop into pans P being moved by an indexer pan feeder 7 along a linear path in a stepwise manner.

FIGS. 2, 2A and 2B

FIGS. 2, 2A and 2B depict a conventional batch process for making loaves of bread. When employing the prior art process illustrated in FIG. 2, extensive floor spaced and equipment is required as shown in FIGS. 2A and 2B. This space and equipment is costly and demands maintenance.

In this batch process the ingredients for a selected bread recipe are mixed in a conventional dough mixer 8, which may have a temperature control system that maintains the temperature of the ingredients in the mixer at about 68 degrees Fahrenheit. When the ingredients are thoroughly mixed and in a viscous state, the whole batch of dough mix is dumped into the holding dough hopper of a transfer dough pump 9, transfers the dough to an extrusion dough divider hopper 10c and into an extrusion dough divider EDD. The extrusion dough divider EDD is built with a gear motor drive, and a dual auger feeder, and acts as a pump to pressurize the dough to a pre-set pressure value of a process recipe, set in a programmable logic controller (PLC) at a human-machine interface (HMI). In response to a dough pressure sensor 12 located at a discharge end of the extrusion dough divider EDD, the gear motor drive will speed up or slow down the auger rotational speed to satisfy the pressure set point value set in the recipe required pressure value. A metering dough pump 11 meters a constant volumetric dough flow at an exit 10a of the extrusion dough divider EDD. The rate of speed of the pump drive controls the rate and scaling-weight at which severed dough packets SDP are produced. The speed required of the dough metering pump gear motor drive is monitored by a human operator manually checking at pre-scheduled times (every 2 minutes or so) the weight of a sampled dough packet being cut by an extrusion dough divider guillotine-type knife.

The severed dough packets SDP require further processing. Namely, first the severed dough packets SDP are rounded into dough balls by a rounder unit 13. The newly rounded dough balls are flour dusted in duster 14 to prevent the dough balls from sticking to any surfaces while they are transported by a conveyor belt 14a to a sheet unit 15 to make the newly flour dusted dough balls into a very flat disk-like member. From the sheet unit 15, the dough disk-like members are conveyed to a molder belt unit 16, where, with the aid of static top pressure board adjustable up or down rolls, the dough disk like members are formed into individual cylindrical shape dough pieces, before they are deposited into an empty pan cavity. A bread pan indexer 7 synchronizes the deposit of the cylindrical shape dough pieces so an individual piece falls into a single pan cavity.

FIG. 3

Figure 3:
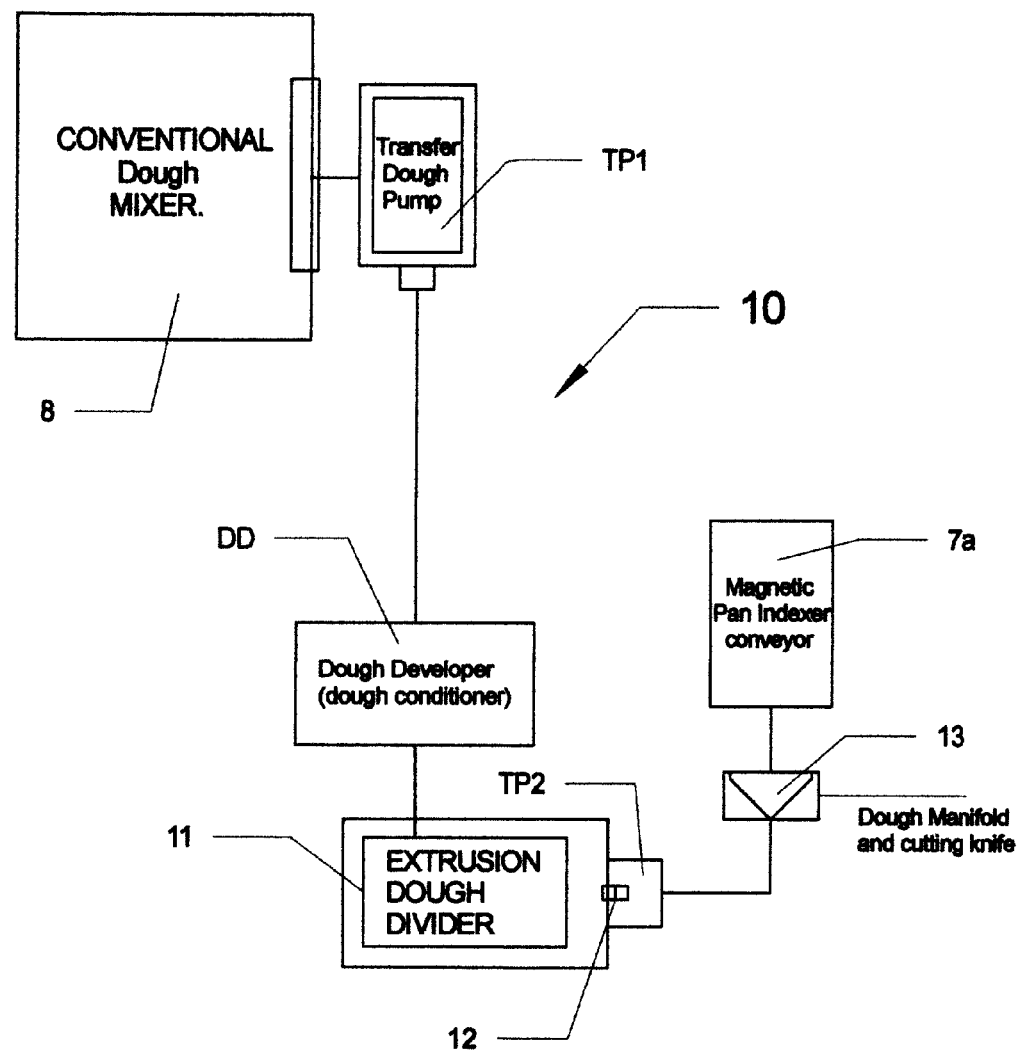
FIG. 3 is a schematic diagram illustrating my process for making a bakery product.

As illustrated in FIG. 3, my process has the advantage of a batch process in that the dough mix used produces the desired stiff texture bread loaf and the advantage of a continuous process that avoids the downstream processing steps and equipment depicted in FIGS. 2A and 2B. Initially, all the ingredients of a conventional batch mix recipe to make a batch of bread dough are mixed in a conventional mixer 8 to produce a conventional dough mix, which is significantly more viscous than the dough mix from the pre-mixer 3 using a standard recipe in a continuous mix process. At first this mix has therein small sized air pockets that become larger and different sized air pockets as the fresh dough mix ages. The air pockets are produced by the chemical reaction of yeast, sugar, flour and other ingredients. A single batch provides a predetermined number of bread loaves, for example, from about 1,400 to about 2,000 loaves per batch.

As soon as the ingredients have been thoroughly blended together and the reaction starts, a first transfer pump TP1 immediately, continuously and directly feeds the unconditioned dough from the mixer 8 into a conventional dough developer unit DD. The now conditioned dough flows directly into an extrusion dough unit 11 having a unique die manifold member 23 that is designed especially for high-speed production of pan-ready dough packets. The pan-ready dough packets made according to my process fall directly into a pan cavity upon being severed from a continuous dough stream by a uniquely designed cutter 26 best illustrated in FIGS. 10A through 10C. Thus, my process eliminates the downstream processing steps and equipment of the conventional batch process depicted in FIGS. 2, 2A and 2B.

Figure 11:
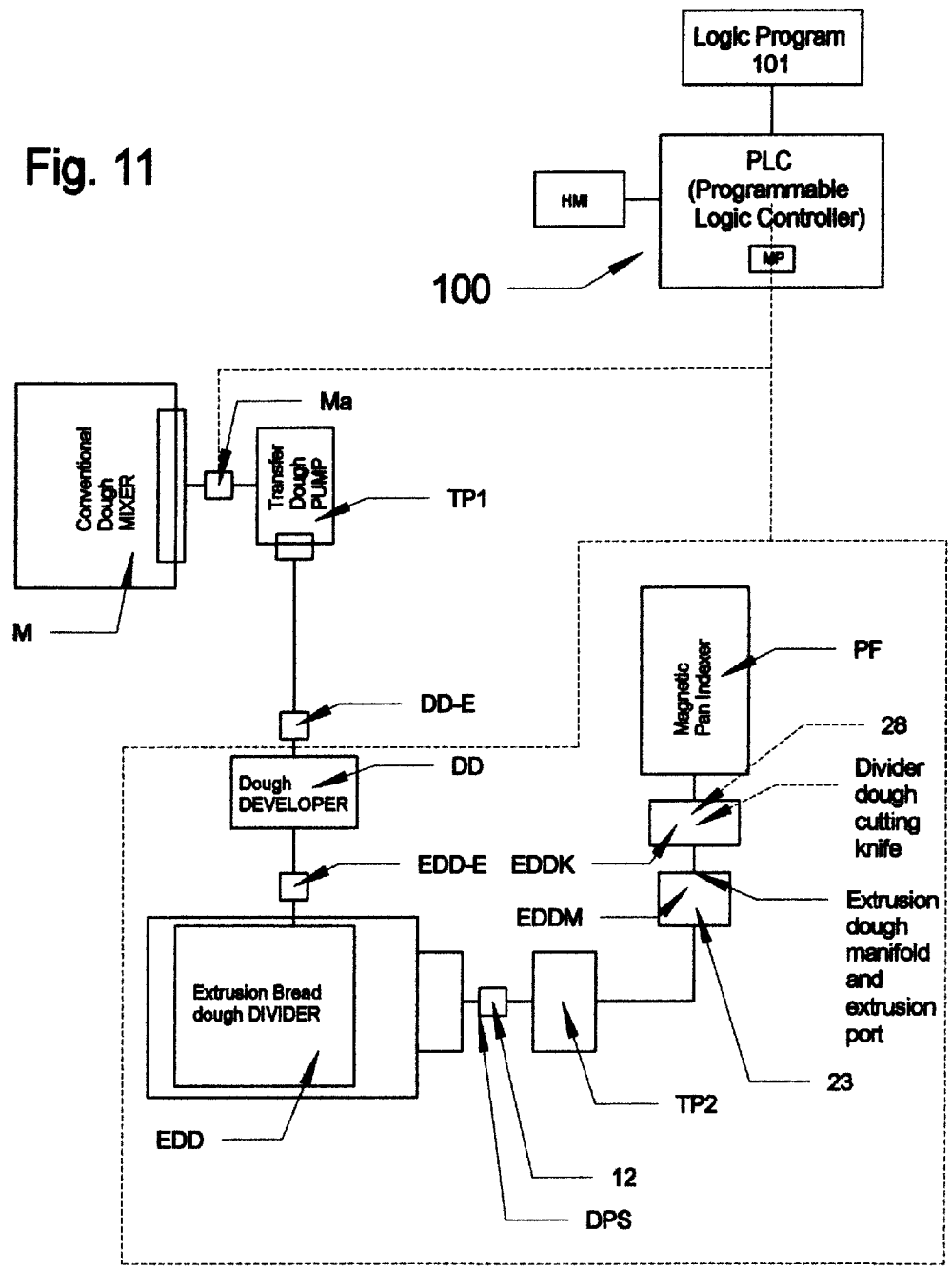
FIG. 11 is a control circuit diagram for my apparatus.

A conventional dough developer unit DD continuously conditions the batch of unconditioned dough to reduce the size of air pockets within the unconditioned dough. Ideally, the conditioned dough has a uniform density and a uniform texture as it exits the dough developer unit DD that is maintained more or less constant throughout the entire processing of a batch of the dough mix. The dough developer unit DD (FIGS. 4, 5, 7) has a gear motor GM1 that drives a single auger 20, and a gear motor GM2 that drives a developer blade 21. The developer gear motors GM1 and GM2 drive speeds (recipe speeds) may be manually or automatically set. In the former case, the gear motors GM1 and GM2 drive speeds are monitored by a human operator who manually changes the set speeds at a human-machine interface control panel HMI as required by the process recipe. Alternately, to maintain a constant uniform density and uniform texture of the dough, the dough developer auger 20 and the developer blade 21 rotational speeds will be increased or decreased according to an electronic speed control logic sequence in a main control process programmable logic controller PLC (FIG. 11). A sub-routine of a program 101 of a microprocessor MP of a control circuit 100 provides automatic speed control to maintain a uniform density and uniform texture of the dough stream exiting the dough developer unit DD. Thus, a conditioned dough is continuously fed to the extrusion dough divider unit 11 at various speeds to maintain a uniform density and uniform texture.

Figure 10A:
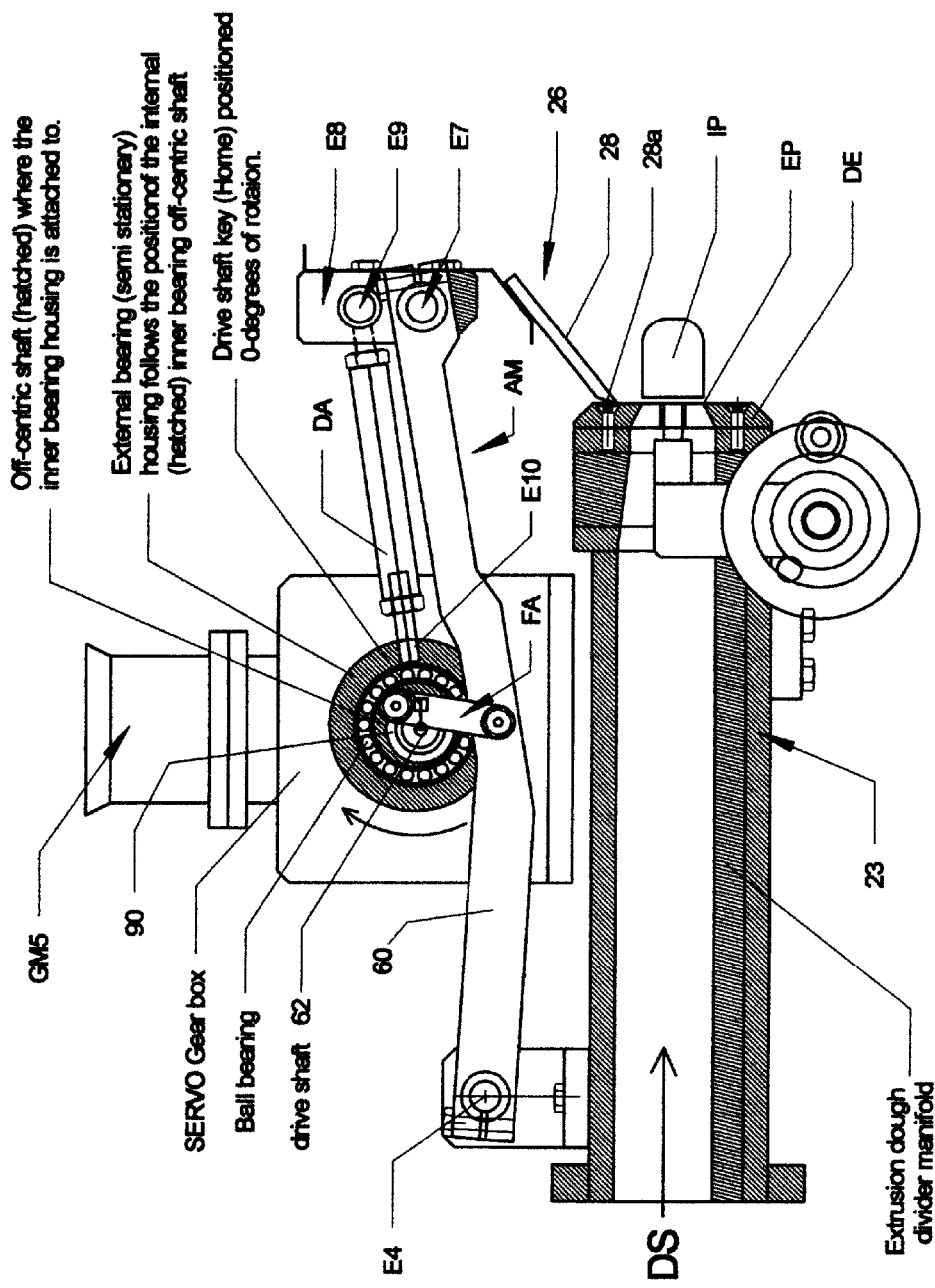
FIGS. 10A through 10C depict the cutting cycle where.
Figure 10B:
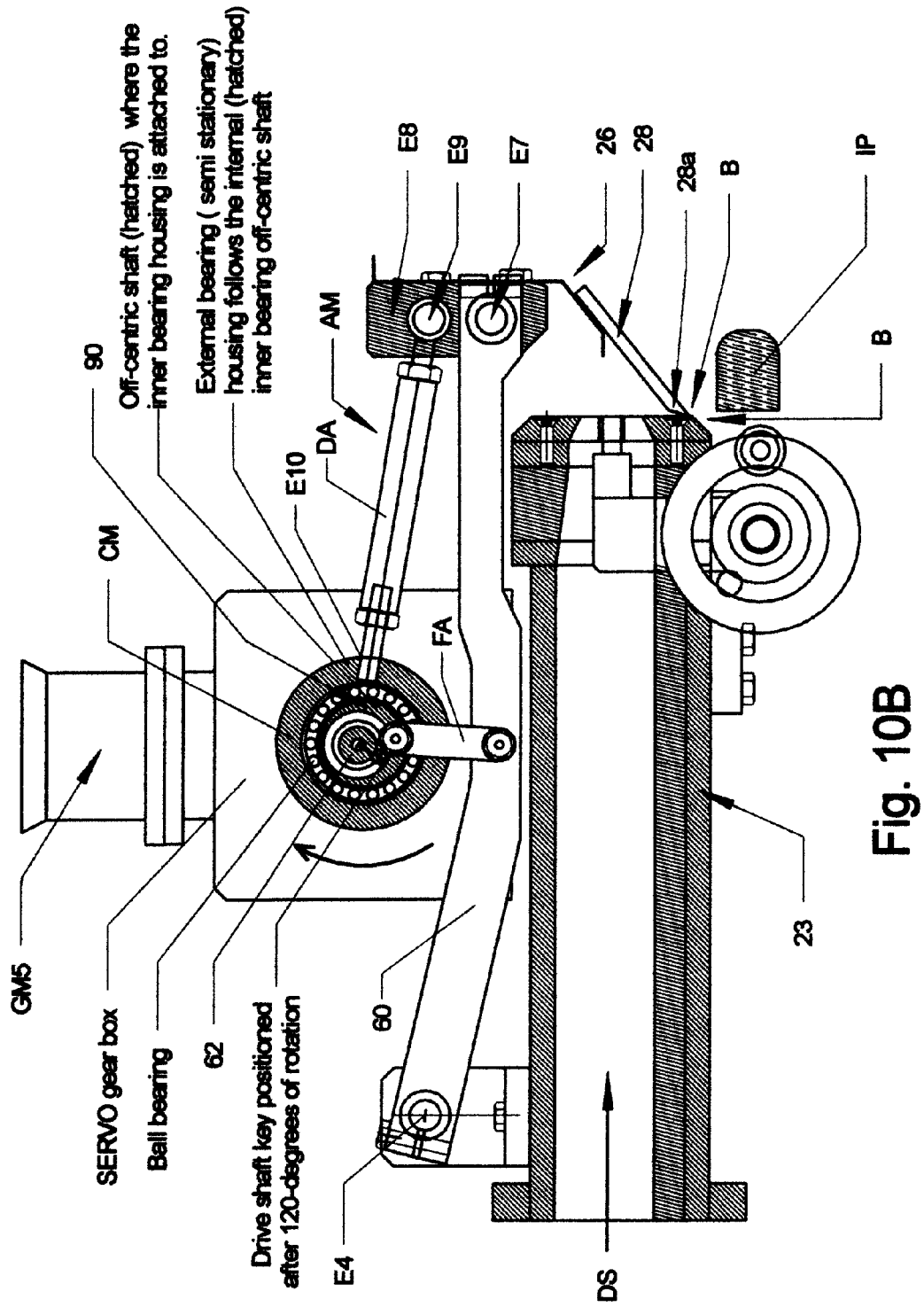
Figure 10C:
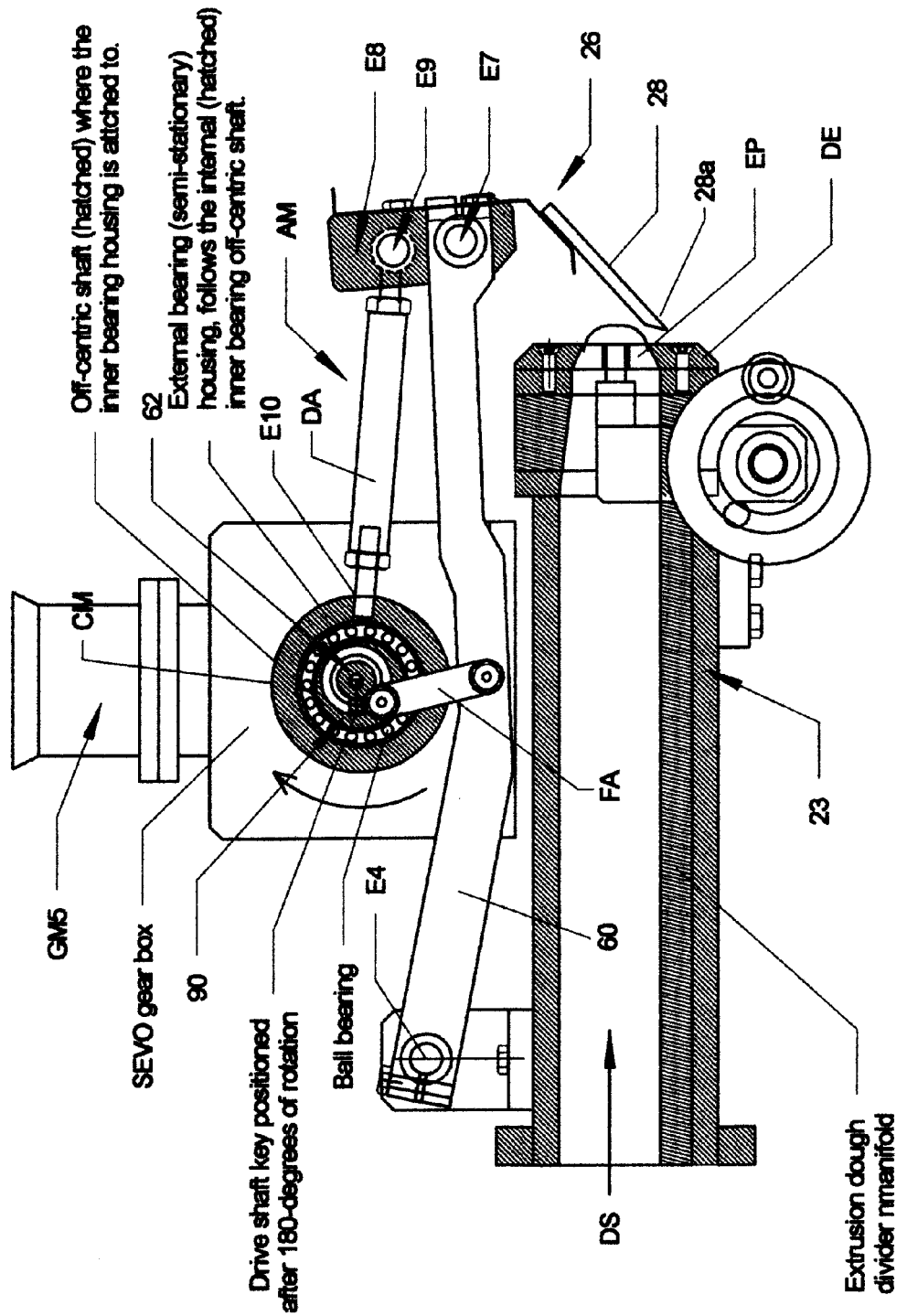

In my process, the conventional dough developer unit DD transforms large size air pockets within the unconditioned dough, dividing the larger air pockets into smaller size air pockets, so that dough exiting the developer unit DD is conditioned with a uniform density and uniform texture. This achieves a uniform product quality and a uniform scaling. Consequently, in my process a human operator does not periodically sample and weigh the dough packets to insure the individual bread loaves being made do not vary more than quality standards demand. A suitable dough developer unit DD is sold by Emico, Inc. of Santa Fe Springs, Calif., and is best illustrated in FIG. 7. Using such a dough developer unit DD upon formation of a packet, the packet drops, due to gravity, directly into a cavity C of a pan P without further processing of the packet after cutting the dough stream to form the packet as shown in FIGS. 10A-10C, and discussed subsequently in greater detail.

FIGS. 4-7

Figure 4:
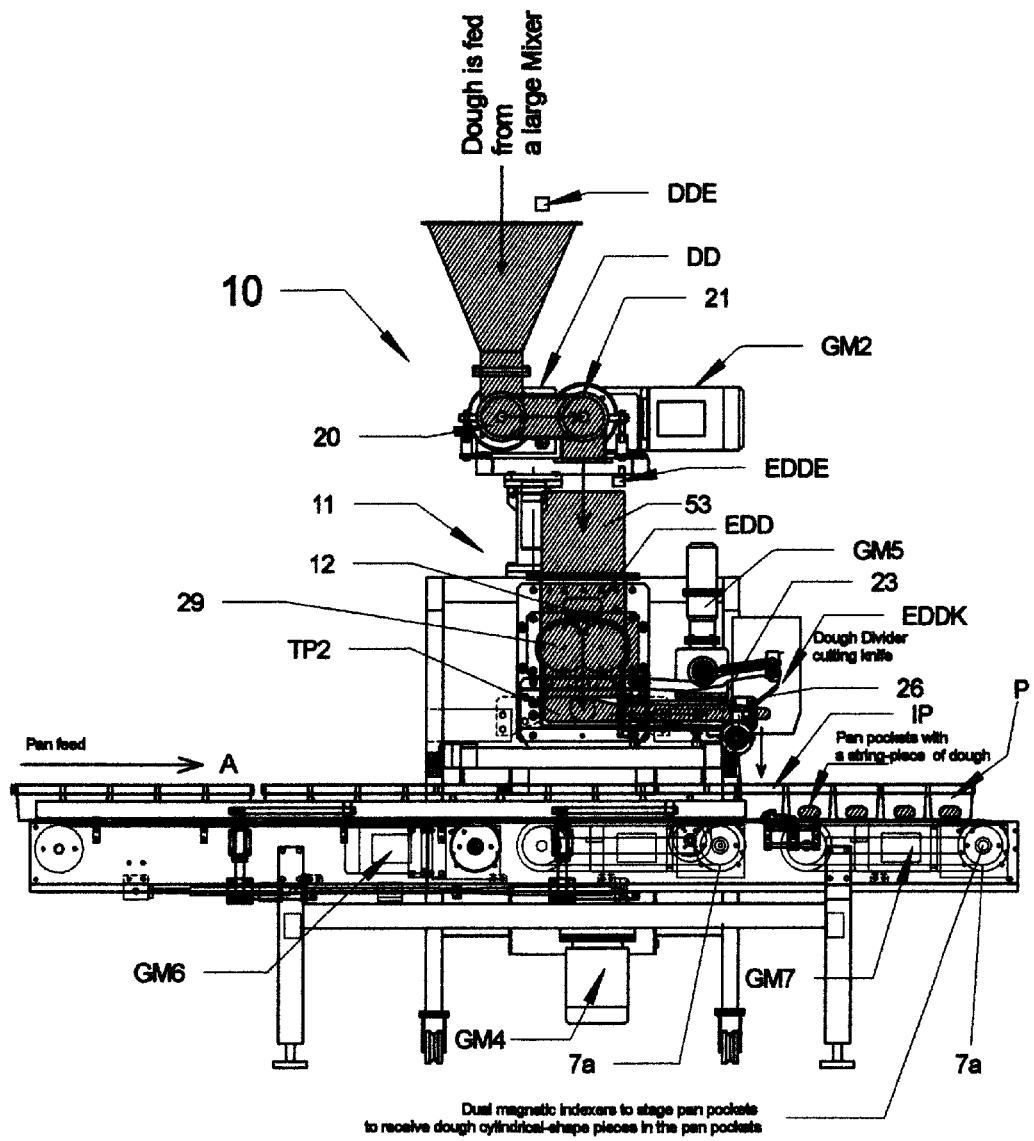
FIG. 4 is a front elevation view of my apparatus, with sections broken away.
Figure 5:
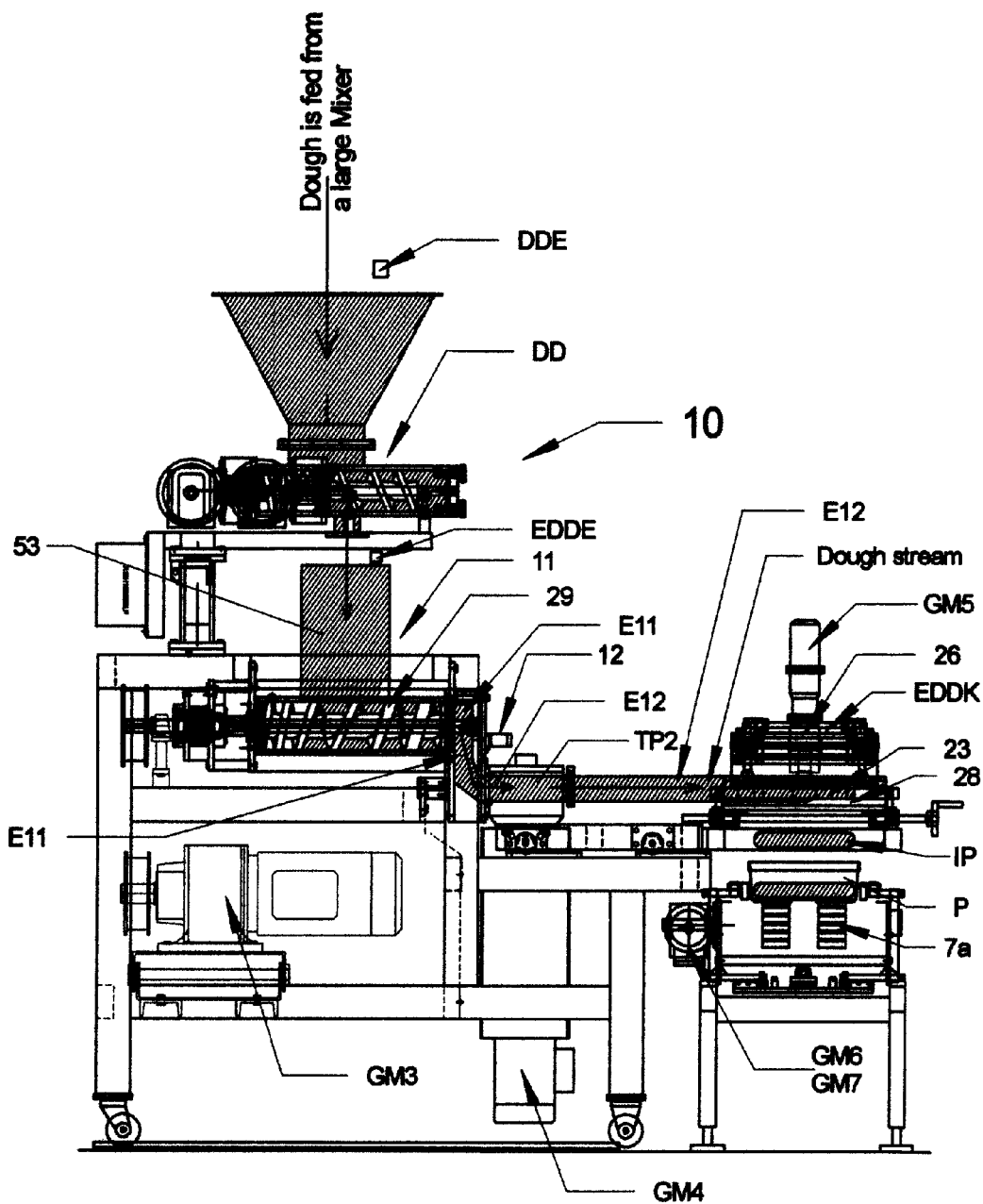
FIG. 5 is a side elevation view of my apparatus, with sections broken away.

As illustrated in FIGS. 4 and 5, one embodiment of my apparatus embodying my system is generally designated by the numeral 10. The movement of dough through my apparatus 10, and the operation of the various system components, are in a timed relationship that is under the control of the circuit 100 shown in FIG. 11. In my system the processing of a batch of dough from the mixer 8 is completed within a predetermined time period so that a last individual packet IP of the batch being processed and a first individual packet of this same batch have the same uniform density and uniform texture within a pre-established variation range. Typically, the entire batch is converted into individual packets IP of conditioned dough corresponding to the predetermined number of bread loaves to be produced from the batch. These packets IP are deposited individually in cavities C of the pans P within 10-20 minutes after mixing ingredients that make the batch.

The extrusion dough divider unit 11 extrudes the conditioned dough into a dough stream DS (FIGS. 5, 8A, 10A-10C), and is built with a dual auger dough feeder 29 (FIG. 4) driven by a gear motor GM3. A control dough pressure sensor 12 (FIGS. 3, 5) is at a discharge end E10 (FIG. 5) of the extrusion dough divider unit 11. The speed of the extrusion dough divider's drive gear motor GM3 is controlled by the program 101 for the microprocessor MP in response to the pressure detected by the pressure sensor 12 and the command of the recipe speeds set values at the HMI. For the purpose of achieving a constant density before the dough is directed to an intake of a second transfer metering dough pump TP2 (FIGS. 4, 5 and 6), this pump meters the conditioned dough from the dough divider dual auger 29 to the die manifold member 23, which includes an extrusion port EP from which the dough stream exudes. The control circuit 100 shown in FIG. 11 includes means for operating the transfer pumps TP1 and TP2 at predetermined regulated speeds. The control circuit 100 includes the pressure sensor 12 (FIGS. 5, 6) that detects the pressure of the dough stream DS exiting the extrusion divider unit 11 and a microprocessor MP with a program 101 to operate speed controls as a function of the detected pressure commanded by the process recipes at the human-machine interface HMI.

The conditioned dough from the dough developer unit DD is delivered to the extrusion dough divider hopper 11, and the extrusion dough divider unit 11 extrudes the dough-through an extrusion port EP (FIG. 8B) as a constant solid, wide flat dough stream DS of conditioned dough at a controlled volumetric feed rate and at a controlled pressure. In accordance with my process, the cutter 26 immediately cuts the dough stream DS into individual dough packets IP that drop, due to gravity, directly into a individual cavity C in a pan P moving past the cutter. As best shown in FIG. 4, a pair of endless belt, pan feeder conveyors 7a (FIGS. 4, 5, 6) aligned along the path A are spaced apart to provide a gap G directly beneath an extrusion port EP of the die manifold member 23. As a batch of dough mix is processed, the pans P continuously move in a step-wise fashion along the predetermined path A and receive an individual dough packet IP therein that drops into a pan directly below the extrusion port EP. When the processing of one batch of dough mix is completed, the apparatus 10 is cleaned whenever a batch of a different recipe is to be processed by the apparatus. When cleaning the apparatus 10 no pans P are covering or blocking the gap G. Consequently, the gap G is open between the pan feeder conveyors 7a. As the apparatus 10 is flushed out with water, waste matter flowing out the extrusion port during cleaning flows from the extrusion port EP and passes through the gap G between the pan feeder conveyors 7a.

FIGS. 6A, 8A, 9 and 10A through 10C

As best shown in FIG. 8A, the extrusion dough divider unit 11 includes the cutter 26 that in a continuously cyclical manner cuts the dough stream DS into individual packets IP (FIGS. 8A, 9, 10B). The dough developer unit DD is above the extrusion dough divider unit 11 and feds the conditioned dough into a hopper 53 of the extrusion dough divider unit 11. The extrusion dough divider unit 11 has a pipe 51 (FIG. 6) that delivers directly and continuously the dough stream DS to the cutter 26.

The cutter 26 (FIGS. 8A, 9, 10A, 10B, 10C) includes pivotally mounted, arm mechanism AM driven by the gear motor GM5 that moves a knife blade 28 through a predetermined path X (FIG. 8C) that clears the dough divider's extrusion port EP in a manner to avoid interfering with the dough stream DS exiting the extrusion port EP. The path X is depicted in FIG. 8C and comprises: Starting with the tip 28a of the blade 28 at the home position A (FIG. 10A), the arm mechanism AM includes a pair of arms 60 that move the blade downward towards a portion of the dough stream DS that has past through the extrusion port EP, severing this portion, which falls directly into a cavity C of the pan P. The tip 28a of the blade 28 moves along a downward vertical-linear segment X1 of the path X past the extrusion port EP to the point B (FIG. 10B), with the tip 28a of the blade 28 following the linear segment X1 as it passes by the extrusion port EP to arrive at point B, the end of the downward vertical-linear segment. As the next portion of the dough stream DS exits the extrusion port EP, the tip 28a of the blade 28 moves from point B away from the face of the die element of the manifold member 23, and then along a substantially upward vertical-linear path, returning the tip 28a of the blade 28 to the home position A without contacting the next portion of the dough stream DS exiting the extrusion port.

As best shown in FIG. 8D, the pair of arms 60 are mounted at ends E6 to pivot. The blade 28 is fixedly attached between the pair of arms 60 to the other ends E7 of the arms 60. About midway along each arm 60 is a follower arm FA interconnected to a cam mechanism CM that actuates a driver arm DA having one end E10 fixedly attached to the cam mechanism. There are a pair of driver arms DA and the blade 28 is mounted between the ends E9 of the driver arms DA. The blade 28 is pivotally attached so it moves along the path X as the follower arm FA and a cam mechanism CM interact. As a cam 90 (FIGS. 10A-10C) of the cam mechanism CM is rotated by the cam mechanism's central drive shaft 62, on a down stroke initiated from the home position A shown in FIG. 10A, the tip 28a of the blade 28 follows the linear segment X1 of path X. On reaching position B shown in FIG. 10B, the drive shaft 62 of the cam mechanism CM initiates its upstroke, as shown in FIG. 10C, causing the follower arm FA to begin lifting the arm 60 upwards and raising the tip 28a of the blade 28. Simultaneously, the tip 28a of the blade 28 is moved away from the face of the die element DE, by the action of the driver arm DA pulling backward on the end E9 of the arm DA, to pivot this end at bearing points E7 of arms 60, attached to the floating knife block support elements E8, and continuously pulls the tip 28a away from the face of the die element DE, with the aid of the pivot point E7 at the end of arm 60, attached to the floating knife support blocks E8, by the pivot shaft on E7, and then moves the tip towards the face of the die element DE as the cam mechanism continuously rotates until home position A is reached. The program 101 includes a subroutine that operates the gear motor GM5 at a faster rate of speed after severing the dough stream DS, increasing the speed at which the knife blade 28 returns to the home position A. The cutting cycle is then again initiated.

As best shown in FIGS. 8B and 8D, the extrusion port EP is at a terminal end of a chamber 50 in the die element DE. The chamber 50 has an entry end E5 and the extrusion port EP is at an end E6 opposed the entry end. The chamber 50 has a generally flat top and bottom and outward sloping sides to form a generally shaped triangle configuration. The extrusion port EP has a generally rectangular shaped open window that has an adjustable open area that allows the shape of the extrusion port to be laterally expanded or reduced. To achieve this each side of the extrusion port EP includes a pair of spaced apart, adjustment wedge-slides 40A, 40B (FIGS. 8B, 9). Each wedge-slide 40A and 40B has a semi-circle shape cut out on the inner end thereof facing the chamber 50. The adjustment of the wedge-slides 40A and 40B in and outwards on each side of the window opening by repositioning the slides changes the weight of the product being processed at the time. An individual, single, packet IP has a generally cylindrical configuration, typically a diameter from 1¼ to 2½ inch and a length from 8 to 16 inch. This size and configuration of the packet IP is suitable upon baking to make one bread loaf, which is removed from the pan's cavity C (FIG. 8A) in which the loaf was baked. As shown in FIG. 9, a manually actuated adjustment mechanism 92 (FIG. 9) with a hand operated wheel HW mechanically linked to the wedge-slides 40A and 40B enables the slides to be move towards and away from a center of the extrusion port EP.

Operation

In the embodiment where a constant uniform density and uniform texture of the dough is automatically controlled, every time a new batch of unconditioned dough is dumped into the first transfer pump TP1, a mixer generated time (true) signal is sent as an input to the programmable logic controller (PLC) at a human-machine interface (HMI) shown in FIG. 11. The program 101 of the programmable logic controller PLC starts a new sequential sub-routine upon receiving this time signal that:

1. Controls the speeds of the developer blade gear motor drive GM5 in a incremental timed sequence of a dough batch process time, slower when the dough batch is fresh and faster as the dough batch ages. After every dough batch process time, the programmable logic controller PLC is monitoring the time signal repeatedly automatically, without the aid of an operator to start a new sequential sub-routine. This sequential sub-routine controls the speeds of the developer blade gear motor drive GM2 to maintain a uniform density and texture (conditioning) of each dough batch through its entire process time period (typically from 10 to 20 minutes) in small incremental speed sequential control, as best predetermined by the process requirements.

2. Controls the speed of the second transfer pump TP2, divider metering dough pump gear motor GM3 in a incremental timed sequence of a dough batch process time, (slower when the dough batch is fresh and faster as the dough ages). After every dough batch process time, the programmable logic controller PLC is monitoring the time signal repeatedly automatically, without the aid of a human operator to start a new sequential routine. This sequential sub-routine controls the speed of the second transfer pump TP2, a metering dough pump gear motor GM4 to maintain a consistent volumetric dough flow to the die manifold member 23 for the sole purpose of achieving a consistent scaling weight of each dough packet IP being cut in small incremental speed sequential control, as best predetermined by the process requirements.

The transfer dough pump motor GM1 starts to run on a demand signal created by a level sensor electronic eye DDE at the dough hopper if the eye signals a low level. The first transfer pump TP1 starts to supply unconditioned dough to dough developer unit DD until the dough hopper 53 is filled to its highest level. The electronic eye DDE monitors the dough levels low and high at the dough hopper 53, and as the dough level sensor is satisfied (high level) the gear motor GM2 variable speed drives can be started by the programmable logic controller PLC, provided all safety and other support systems are ready.

A level sensor electronic eye EDDE monitors the dough levels low and high at the dough hopper 53, and as the dough level sensor is satisfied (high level) the dual auger, variable speed gear motor GM3 can be started by the programmable logic controller PLC, provided all safety and other support systems are ready. The gear motor GM3 operates the extrusion dough divider unit EDD to feed the dough as a continuous evenly pressurized dough stream DS. The pressure sensor 12 continuously monitors the dough stream DS to confirm it satisfies the pressure value preset in the recipe for the type of bread loaf being made. This dough stream DS is fed directly into the intake of the second transfer pump TP2. This pump TP2 is a metering dough pump with a variable speed gear motor drive GM6. The speed and volumetric capacity controls the volumetric rate of the dough being extruded through the die manifold member 23. The arm mechanism AM is driven by the servo motor GM5, which has speed cycles that are set in the recipe, the cycle rate being set to match the cuts/minute of the process, and to deliver the dough packets in a timed manner into an empty pan cavity C.

3. The steps to start and run the apparatus 10 are as follows:

a—The operator selects a recipe number at the human-machine interface HMI.

b—The operator makes any temporary recipe speed adjustment values.

c—When electronic eye DDE is satisfied, the system will be able to start, by pressing a start button at the human-machine interface HMI.

d—The dough developer gear motor GM2 starts to run to the speeds preset for the recipe for the type of bread loaf to be processed, the auger dough feeder 20 moves the dough into the developer blade 21 driven by GM2, discharging the dough into the dough hopper 53 of the extrusion dough unit 11 until the electronic eye senses that the dough level is satisfied. The variable speed gear motor drive GM3 starts running the dual auger 29, feeding and pressurizing the dough to satisfy the pre set pressure value in the recipe. As shown in FIG. 5, the pressure sensor 12 continually monitors pressure at an outlet end E11 of the extrusion dough unit 11 before the pressurized dough stream DS is fed into an intake end E12 of the second transfer pump TP2, which pushes a metered amount of the dough through the die manifold member 23 at a predetermined volume rate. Each newly cut dough packet falls into each empty pan cavity C, pan feed conveyors 7a are cyclically controlled by a timing signal (clock) created in the programmable logic controller PLC, which in turn controls the cyclical sequence of the knife blade 28 and the pair of pan conveyors 7a in a synchronous sequential speed rate. Thus completing the running cycle of my process.

e—When the electronic eye DDE senses a low level condition, it demands more dough supply from first transfer pump TP1.

f—When the other electronic eye EDDE dough senses a low level condition, it demands more dough supply from the dough developer unit DD.

g—These conditions described on steps c, d, e, f, g above, are continuous repetitious cycles throughout the duration of each batch of dough processed through my apparatus 10.

SCOPE OF THE INVENTION

The above presents a description of the best mode I contemplate of carrying out my apparatus, system and process, and of the manner and process of making and using them, in such full, clear, concise, and exact terms as to enable a person skilled in the art to make and use. My apparatus, system and process are, however, susceptible to modifications and alternate constructions from the illustrative embodiment discussed above which are fully equivalent. Consequently, it is not the intention to limit my apparatus, system and process to the particular embodiment disclosed. On the contrary, my intention is to cover all modifications and alternate constructions coming within the spirit and scope of my apparatus, system and process as generally expressed by the following claims, which particularly point out and distinctly claim the subject matter of my invention:

The invention claimed is:

1. An apparatus for making bread loaves including
a mixer in which ingredients to make a batch of bread dough are mixed to produce an unconditioned dough having enlarged and different sized air pockets, said batch providing a predetermined number of bread loaves,
a pan feeder that continuously moves baking pans in a stepwise manner along a predetermined linear path, each pan having at least one empty cavity sized and configured to bake a single bread loaf,
a dough developer unit above said predetermined linear path, and above an extrusion dough divider unit, that reduces the size of air pockets within unconditioned dough, so that dough exiting the developer unit is conditioned,
a first transfer pump that continuously feeds the unconditioned dough from the mixer to the dough developer unit,
an extrusion unit below the dough developer unit and above the predetermined linear path that continuously extrudes the conditioned dough into a single dough stream,
a second transfer pump that continuously meters the conditioned dough from the extrusion unit through an extrusion port of a die manifold member of the extrusion unit,
a cutter unit above the predetermined linear path that continuously cuts the single dough stream into individual packets, wherein each of the individual packets are deposited in an individual cavity in a pan moving along said predetermined linear path,
said extrusion port positioned relative to the predetermined linear path such that upon cutting the single dough stream, each of the individual packets drops directly into a cavity of a pan positioned directly beneath the extrusion port, and
a control system that delivers the single dough stream to the cutter unit at a controlled volumetric feed rate and at a controlled pressure, wherein the control system includes a monitoring element configured to sense an amount of the conditioned dough being produced and, in response thereto, regulates operation of the dough developer unit.

2. The apparatus of claim 1 where the extrusion unit includes the extrusion port in a face of the die manifold member from which the single dough stream exits and the cutter unit includes a blade that moves through a predetermined path from a home position above the single dough stream, along the face of the die manifold member past the extrusion port to sever the single dough stream, and then away from the face of the die manifold member in a manner to avoid interfering with the single dough stream from continuing to exit the extrusion port.

3. The apparatus of claim 2 where the extrusion port has a rectangular shape with opposed sides, each side comprising a laterally adjustable wedge-like shaped slide element to enable a width of the extrusion port to be changed.

4. The apparatus of claim 2 where the blade that is moved from a home position above the single dough stream along a downward vertical-linear path at a first rate of speed and, after moving away from the face of the die manifold, is moved at an increased rate of speed and, after moving away from the face of the die manifold, is moved at an increased rate of speed to the home position at least in part along an upward vertical-linear path.

5. The apparatus of claim 1 where the die manifold member includes a chamber having a generally flat top and flat bottom and outward sloping sides to form a generally shaped triangle configuration with an entry end at an apex of the triangular configuration and the extrusion port forming a base of the triangular configuration.

6. The apparatus of claim 1 where the pan feeder includes a pair of aligned pan conveyors along said predetermined linear path along which the pans move that are spaced apart to provide a gap beneath the extrusion port to facilitate flushing waste matter from the apparatus during cleaning.

* * * * *